March 1, 1966 P. CHAROS 3,237,425
REFRIGERATED ROLLER MIXERS
Filed Nov. 13, 1962
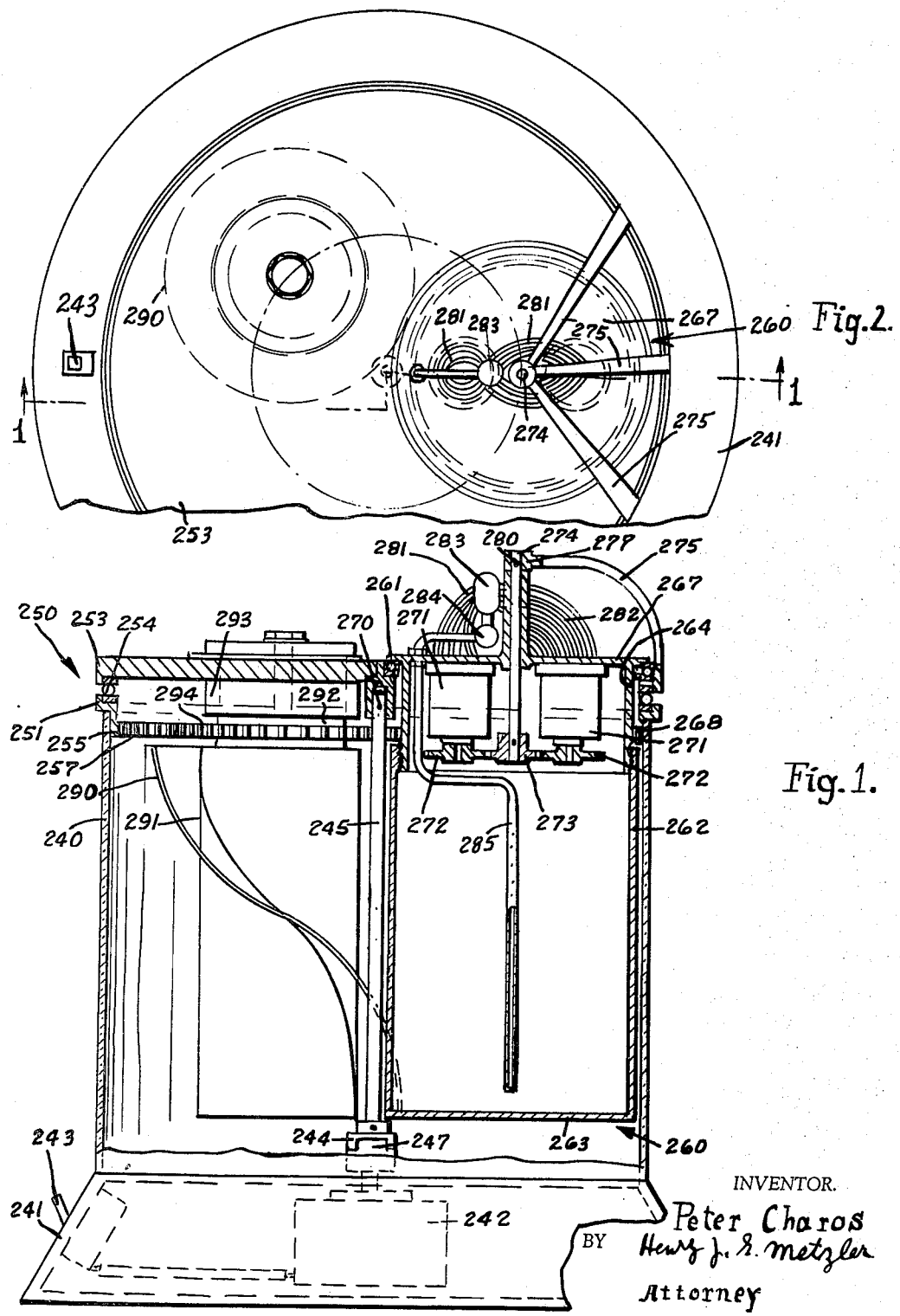
INVENTOR.
Peter Charos
BY Henry J. S. Metzler
Attorney United States Patent Office 3,237,425
Patented Mar. 1, 1966

3,237,425
REFRIGERATED ROLLER MIXERS
Peter Charos, Maylen Drive, Hampton Bays, N.Y.
Filed Nov. 13, 1962, Ser. No. 237,125
2 Claims. (Cl. 62—342)

The present invention relates to devices for making ice cream and other frozen products and, more specifically, it relates to an improvement in roller mixers such as are disclosed by my Patent No. 2,987,301.

One object of the present invention is the provision of a device of the character described which can be used in connection with vessels containing material that is to be mixed and frozen, for instance, for the preparation of ice cream or the like; thus, my present invention relates only to a portable refrigerated mixing mechanism which enables its user to save the work which hitherto has been necessary for transferring the ingredients that are to be mixed from a shipping container to a mixing machine and, after the mixing, from the machine to a dispensing vessel or the like.

By means of my new and improved refrigerated roller mixer it will be possible to ship the ingredients in a container which, after the mixing and freezing, can be used as a dispenser, and to treat these ingredients completely with my roller mixer, without removing the ingredients from said container.

Another important object of the present invention is the provision of a device of the character described which has contained in each mixer roller a complete refrigerating unit of the customary construction that comprises all the necessary elements such as a condenser or heat exchanger unit, a compressor unit, an expansion valve and the like.

A further object of the present invention is the provision of a device of the character described which is comparatively light in weight, so that it can be switched easily from one container to another, which has a very high degree of cooling efficiency, which can be cleaned easily and quickly and which also is durable, sturdy and well adapted for withstanding the rough usage to which commercial mixing and freezing devices frequently are subjected.

With the foregoing and other objects which will appear as the description proceeds, the invention consists of certain novel details of construction and combinations of parts hereinafter more fully described and pointed out in the claims, it being understood that changes may be made in the construction and arrangements of parts of the embodiment disclosed without departing from the spirit of the invention as claimed.

In the accompanying drawing I have set forth an illustrative embodiment of my invention.

In said drawing:

FIGURE 1 is a longitudinal vertical sectional view of a preferred embodiment of my invention on line 1—1 of FIG. 2; and, FIG. 2 is a fractional top plan view.

In the drawing the numeral 240 denotes a vessel or a container for the ingredients which are to be mixed and frozen. This container 240, which is open at the top, can be of any suitable design and shape, and that shown in the drawing forming no part of my present invention.

The vessel 240 is supported by a hollow base 241. An electric motor 242 and a switch 243 for the motor 242 are mounted within, or on, the base 241. A first coupling member 244, from which is extended a vertical shaft 245, is detachably connected to a second coupling member 247, which is driven by the motor 242 and extended into the vessel 240.

A top cover member 250, which closes the vessel 240, consists mainly of a stationary ring member 251 and a rotatable disk member 253 supported by friction-reducing bearing elements 254, which are interposed between the members 251 and 253. A rim portion 255 of the member 251, which extends into the vessel 240, is provided with an annular row of internal gear teeth 257.

At least one roller member 260 is rotatably mounted on the disk member 253 by means of bearing elements 261. The roller member 260 preferably consists of a roller 262, which has a closed bottom portion 263, and of a cap member 264, which has a closed head portion 267 and an external annular row of gear teeth 268 engaging the teeth 257 of the stationary ring member 251. The center of the disk member 253 is secured at 270 to the upper end of the shaft 245. One or more compressors 271 are mounted on the cap member 264 and are driven by gear wheels 272, which engage a gear wheel 273 that is secured to a shaft 274 extended into the roller 260 through the head portion 267 of the cap member 264. Arm members 275, which are upwardly extended from the disk member 253, terminate into a hub portion 277, to which the upper end of the shaft 274 is secured at 280.

Heat exchangers 281 and 282 are mounted outside of the roller 262, above the cover head portion 267, and are connected to the compressors 271 as well as to a receiver member 283, which is connected over an expansion valve 284 to a pipe 285, leading cooled refrigerent into the roller 262. The compressors 271 may be of any suitable design and construction, for instance, they may be of the type disclosed by the Patent No. 2,595,738, which is specifically well adapted for small refrigerators and for so-called midget refrigerators.

When the shaft 245 is rotated by the motor 242, the disk member 253 also is rotated, so that the elements 262 and 281 as well as 282 carry out planetary motions due to the engagement of the gear teeth 257 with the teeth 268. Thereby, the compressors 271 are driven by the gear wheels 272 engaging the gear wheel 273.

A spiral-shaped scraper blade 290 is mounted on a cylinder 291, which has a reduced upper portion 292 that is rotatable in a hub portion 293 of the disk member 253. A gear 294 secured to the upper portion 292 of cylinder 291 engages the internal gear teeth 257 of the stationary rim portion 255, so that the rotation of the disk member 253 also will cause a planetary motion of the elements 290 and 291, whereby the blade 290 will scrape along the outer surface of the roller 262. The blade 290 is somewhat resilinet and a portion of it is always in frictional engagement with a portion of the outer surface of the roller 262, so as to scrape ice cream or the like off the roller 262 and stir the ice cream or the like during the operation of the device.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A refrigerated roller mixer comprising a ring-shaped member having internal teeth, a container having an open top to which said ring-shaped member is attached, a base member supporting said container, a source of power contained in said base member, a coupling member driven by said source of power being extended into said container, a first shaft detachably secured to said coupling member, a rotary member driven by said first shaft being rotatably mounted on said ring-shaped member, a hollow member rotatably mounted on a first section of said rotary member having external teeth engaging the teeth of said ring-shaped member, a scraping element rotatably mounted on a second section of said rotary member being in permanent frictional engagement with the outer side of said hollow member and having external teeth engaging the teeth of said ring-shaped member, a refrigerator extended into said hollow member adapted for cooling the hollow member and having heat exchange means extended beyond said hollow member and beyond said rotary member, a curved arm member extending from said rotary member above and beyond said hollow member and forming an arch through which said heat exchange means can pass when said hollow member is rotating a second shaft stationarily attached to said arm member being extended into said hollow member, and gear means interposed between said second shaft and said refrigerator for driving the refrigerator through the relative motion between said hollow member and said rotary member.

2. A refrigerated roller mixer as defined in claim 1, wherein said gear means includes a first gear fixedly mounted on the extended portion of said second shaft within said hollow member, and a second gear adapted to be driven by said first gear; and said refrigerator includes a compressor secured to said hollow member and adapted to be driven by said second gear.

References Cited by the Examiner
UNITED STATES PATENTS 1,054,771   3/1913   Holden _____ 62—346
2,987,301   6/1961   Charos _____ 259—32

ROBERT A. O'LEARY, *Primary Examiner.*